Dec. 19, 1967     KO KO GYI ET AL     3,359,514
ELECTRIC SCANNER

Filed Sept. 13, 1965     3 Sheets-Sheet 1

INVENTORS:
Jacob Chapsky
Ko Ko Gyi

By Keith D. Beecher
Attorney

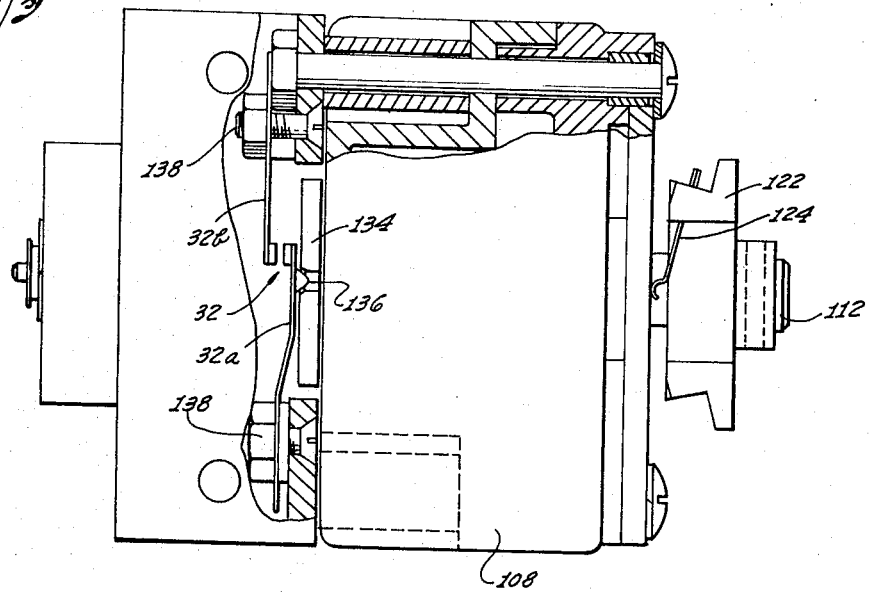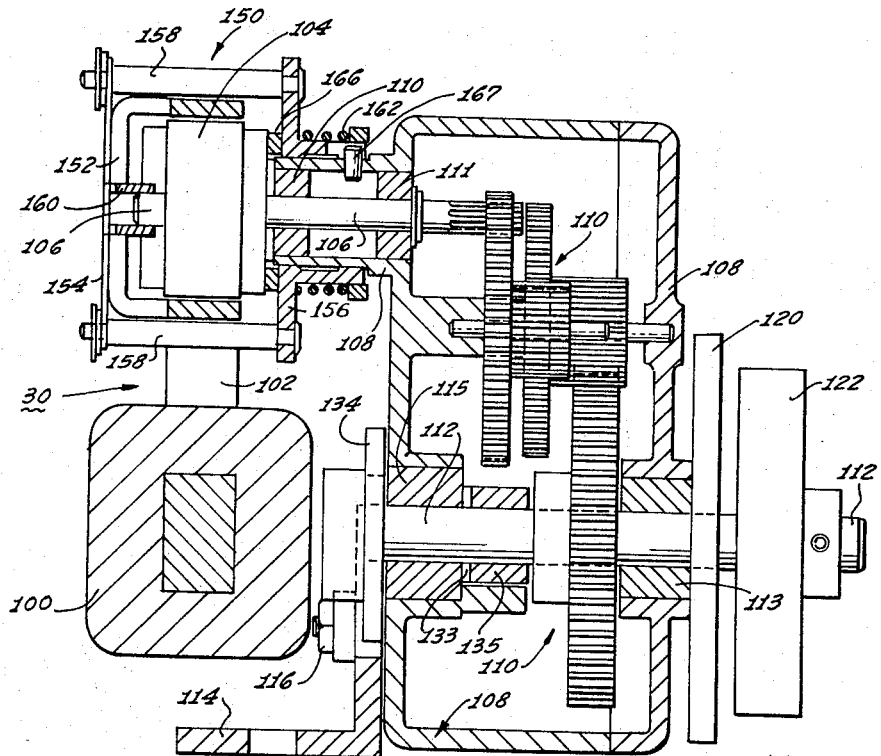

Dec. 19, 1967     KO KO GYI ET AL     3,359,514
ELECTRIC SCANNER

Filed Sept. 13, 1965     3 Sheets-Sheet 3

INVENTORS:
Jacob Chapsky
Ko Ko Gyi

By Keith D. Beecher
Attorney

United States Patent Office 3,359,514
Patented Dec. 19, 1967

3,359,514
ELECTRIC SCANNER
Ko Ko Gyi, Gardena, and Jacob Chapsky, Los Angeles, Calif., assignors, by mesne assignments, to Hersey-Sparling Meter Company, Dedham, Mass., a corporation
Filed Sept. 13, 1965, Ser. No. 486,880
5 Claims. (Cl. 335—68)

ABSTRACT OF THE DISCLOSURE

An electric scanner for use in a data acquisition system comprising an electric motor, a coil for establishing a magnetic field in the vicinity of the motor, a field control assembly coupled with the motor and coil for controlling current flow through the coil, a scanner circuit assembly coupled with the motor for acquiring data in response to the rotation of the motor, and a brake assembly normally in braking relation with the motor and responsive to the magnetic field coil for moving out of braking relationship with the motor in response to the establishment of the field.

---

The present invention relates to data acquisition and telemetry systems, and it relates more particularly to an improved electric scanner for use in such systems.

Copending application Ser. No. 462,281, filed June 8, 1965, in the name of Jacob Chapsky, and copending application Ser. No. 408,594, filed Nov. 3, 1964, now abandoned disclose and claim data acquisition and telemetry systems. Data acquisition and telemetry are used, for example, for obtaining data pertaining to the readings of domestic utility meters throughout a particular locality, and for transmitting such data to a central station for processing purposes.

A digital encoder is installed in each utility meter for converting the meter readings into digital signals. A scanner is also incorporated at each meter, and the scanner serves to convert the parallel digital output signals from the encoder into a serial form. It will be appreciated that the signals must be in serial form before they can conveniently be transmitted to the central processing station without using a large number of separate leads.

As mentioned above, the present invention is concerned with an improved electrical scanner for the above mentioned purpose.

Figure 1:
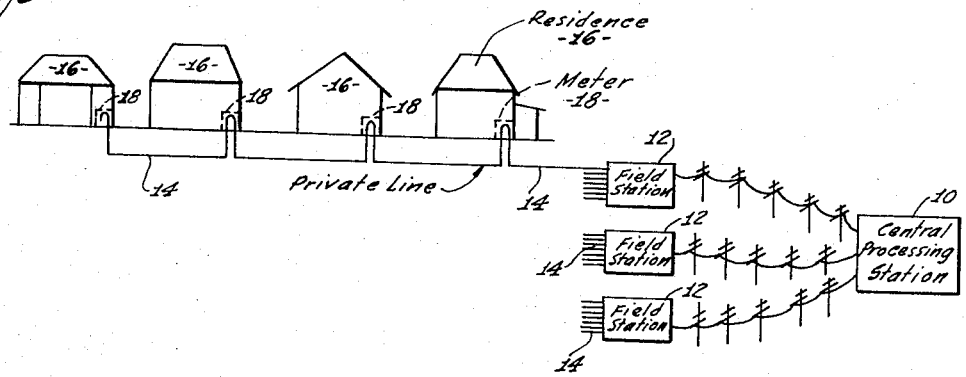
Figure 2:
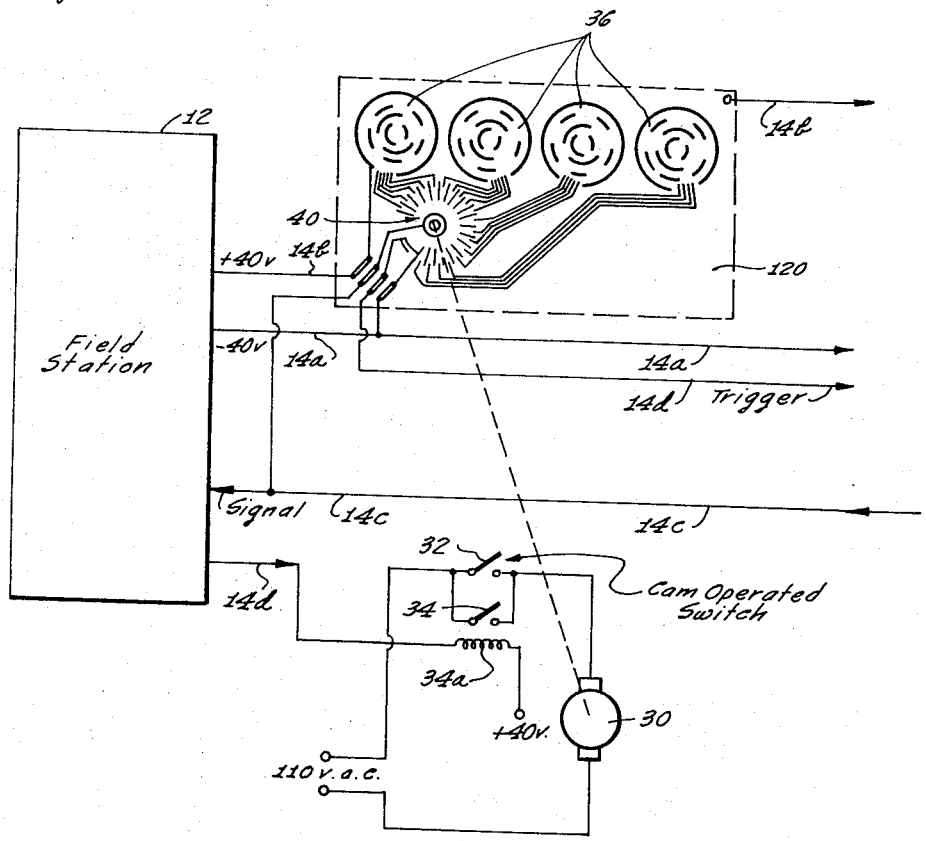
Figure 5:
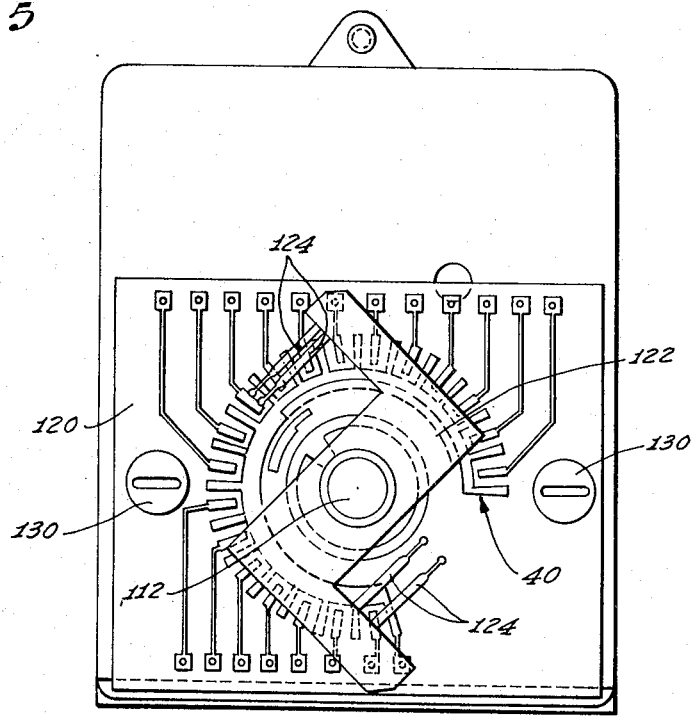
Figure 6:
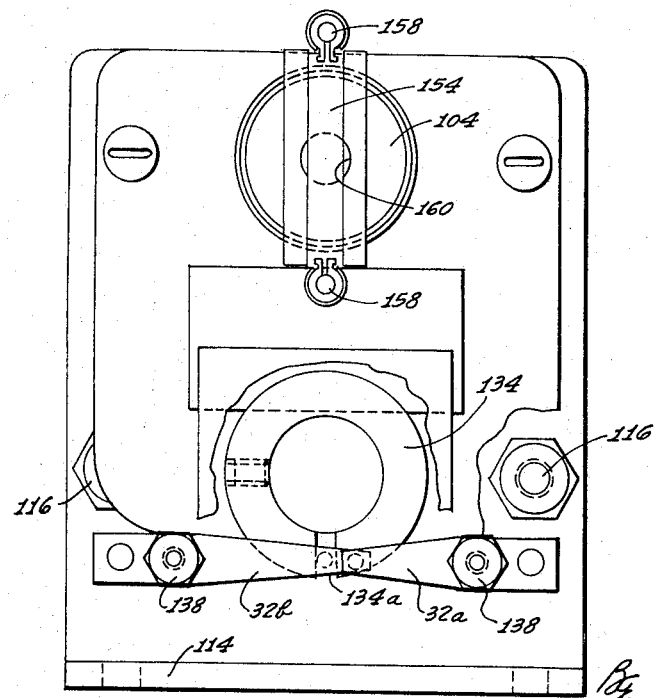

The objects and advantages of the scanner of the invention will become apparent from a consideration of the following specification, when the specification is taken in conjunction with the accompanying drawings, in which:

FIGURE 1 is a schematic representation of a data acquisition system in which the improved electrical scanner of the invention may be incorporated;

FIGURE 2 is a circuit diagram of a scanning system which may incorporate the principles of the present invention; and FIGURES 3-6 are different views of an improved scanner mechanism representing one embodiment of the invention; FIGURE 3 representing a bottom view partly in section; FIGURE 4 representing a side sectional view; FIGURE 5 representing a front view; and FIGURE 6 representing a rear view of the mechanism, partly broken away for purposes of clarity.

As described in detail in the copending applications, the system shown schematically in FIGURE 1 permits the meter readings of a plurality of residences, for example, to be transmitted to a central processing station. The system includes a central processing station 10 which contains the data processing equipment necessary to process the signals received from the meters, and to perform the necessary accounting and billing operation.

The central processing station 10 may be linked with different field stations 12 by means for example, of a Bell System Data Phone. However, any other appropriate communication link may be used. The field stations 12 are positioned so as to service different groups of residences, for example, in a particular area.

When a Data Phone link is used, communication between the central processing staiton 10 and the different field stations 12 is established by dialing the number of each of the different field stations at the central processing station. This dialing operation can be achieved, for example, either manually or automatically.

Each field station 12 has a plurality of multi-lead private lines 14 extending from it. Each private line extends to a number of residences 16, and each line serves to connect a utility meter 18 at each of the residences in series with similar utility meters at the other residences.

Then, when a particular field station 12 is dialed from the central processing station 10, and when a particular line 14 is selected in that field station, a trigger pulse is sent over one of the leads of the line to the utility meter 18 in the first residence 16. This trigger pulse activates a telemetry scanner at that residence, and a series of digital data pulses and interposed clock pulses are sent by the scanner to the associated field station 12 over another lead of the line for transmission to the central processing station 10. The subject matter of the present invention is directed to a telemetry scanner which, as mentioned above, is appropriate for use in such a system.

At the end of the scanning cycle of the telemetry scanner at the first residence, the scanner associated with the utility meter at the second residence is then triggered by a trigger signal sent over a lead of the private line from the first scanner. A chain reaction is thereby set up, which extends from residence to residence, until all the utility meters in the selected line 12 have been read.

Details of the telemetry scanning system for use in conjunction with the individual utility meters 18 is shown in FIGURE 2. The scanner includes a motor 30 which is energized from an appropriate 110 volt source through a cam operated switch 32, and through a relay 34 which has contacts connected in parallel with the cam-operated switch 32.

Each of the lines 14 is made up of a plurality of leads, as mentioned above. For example, a first lead 14a is connected to the negative terminal of a 40 volt direct voltage source at the field station, and a second lead 14b is connected to the positive terminal of that direct voltage source. The digital signals are sent in serial manner from each scanner to the field station over a lead 14c. A trigger pulse is sent from each scanner to the next scanner at the completion of its particular scanning cycle over a lead 14d.

For example, the lead 14d is connected to the relay coil 34a which controls the relay 34. When the lead 14d is momentarily connected to the negative terminal of the 40 volt source, the relay is energized by the resulting trigger pulse, and the switch 34 closes. This brief energization of the relay causes the switch 34 to close long enough so as to start the motor 30. Then, in a manner to be described, the cam operated switch 32 is closed, so that the motor continues to operate throughout one cycle. At the end of that cycle the cam operated switch 32 opens and the motor is de-energized and braked to an immediate stop.

An encoder 36 is mounted at each of the utility meters 18, the encoder including a plurality of electric contact brushes (not shown) which are mechanically coupled to the decade register in the utility meter. Then, as the units, tens, hundreds, and thousands dial settings of the meter rotate, the corresponding brushes make selective contacts with the corresponding units, tens, hundreds, and thousands sections of the encoder 36, so that digital signals (coded in a particular manner) are supplied in parallel to the various contacts of a circuit 40. The circuit 40 is mounted on a circuit board, which will be described, the circuit board being associated with the assembly including the motor 30. The motor drives a wiper assembly which includes electrical contact brushes which selectively engage the conductive and non-conductive segments of the circuit 40.

As described in more detail in the copending applications, the scanning action of the circuit 40 produces positive pulses on the signal lead 14c, whenever a corresponding segment of the circuit represents a "1," for example, corresponding to the particular setting of the associated section of the encoder 36.

Interposed between each of the data segments is a synchronizing segment, so that a negative synchronizing pulse appears on the signal lead 14c between each of the data pulses. This action is also described in more detail in the copending applications.

The electrical contact brushes associated with the wiper assembly driven by the motor 30 move completely around the circuit 40 from left to right. At the termination of the rotation, a connection is made between the negative voltage lead 14a and the trigger lead 14d, so that a negative trigger pulse is sent over the trigger lead 14d to the next meter circuit. This trigger pulse is received at the next scanner so as to energize its motor 30 in the manner described above, so that it can proceed with its scanning operation. This action continues from one scanner to the next down the line, until all the utility meters 18 have been processed.

The details of the motor 30, and the associated scanner assembly are shown in FIGURES 3-6. The motor includes a field coil 100 which is wound on a magnetic core 102. The core 102 surrounds a rotor 104, and a magnetic field is created in the vicinity of the rotor rotatably to drive the rotor when a current flows through the field coil 100.

The above-mentioned magnetic field causes the rotor 104 to rotate, and to impart rotational motion to a drive shaft 106. The drive shaft 106 is mounted in a housing 108, and is supported therein by journal bearings 110 and 111.

A reduction gear transmission assembly is also supported within the housing 108. The transmission assembly includes a series of gears 110 which are meshed with one another, and which ultimately drive a shaft 112 at a reduced speed.

The drive shaft 106, together with the gears 110 and shaft 112 are mounted in the housing 108 in appropriate bearings, and by appropriate spacers, retainer rings, and the like. A mounting bracket 114 is attached to the housing 108 by means, for example, of bolts 116.

A circuit board 120 is mounted on the forward end of the housing 108, and the shaft 112 extends through the circuit board. The shaft is rotatably mounted in bearings 113 and 115. A wiper assembly 122 is mounted on the shaft 112 to be rotated by the shaft. As best shown in FIGURE 5, the wiper assembly includes a plurality of brushes 124 of the electrically conductive resilient type, and these brushes engage the aforesaid circuit 40 on the circuit board 120. As best shown in FIGURE 6, the circuit board 120 is held in place on the housing 108 by means of a pair of screws, such as the screws 130.

The aforesaid cam operated switch 32 is mounted on the rear end of the assembly, as best shown in FIGURES 3 and 6. This switch is controlled by a cam 134 which is also mounted on the shaft 112. The cam 134 has a slot 134a formed in it, and a cam follower 136 on the blade 32a of the switch 32 engages the slot 134. In order to prevent reciprocal linear movement of the shaft 112, which could produce spurious closures of the switch 32 and which could also produce spurious readings by the wiper assembly, a "wave" washer 133 is provided on the shaft between the bearing 115 and a bushing 135. This washer resiliently biases the shaft to the right in FIGURE 4 and obviates any linear movement of the shaft as it rotates.

When the motor 30 is first energized, as explained in FIGURE 2, by energizing the relay 34a, the resulting rotation of its drive shaft 106, and the drive of the shaft 122, causes the cam 134 to rotate, so that the cam follower 136 moves out of the slot 134a, and closes the switch 132. This causes the motor to continue to be energized, until it has completed a full revolution. At that time, the cam follower 136 again falls into the slot 134a, and the switch 32 is opened. Blades 32a and 32b of the switch 32 are supported on the housing 108 by means, for example, of insulated bolts and nuts 138.

It is, of course, important that when the cam operated switch 32 opens, that the motor 30 is immediately stopped. This is achieved by means of a brake assembly 150 (FIGURE 4), which is disposed in the field of the coil 100.

The brake assembly includes a magnetic armature 152 which is mounted on a plate 154. The plate 154, in turn, is supported on a brake shoe 156 by bolts 158. The armature includes a slidable cylindrical portion 160 which receives the end of the shaft 106, and which is slidable along the shaft. A spring 162 normally biases the brake assembly to the left in FIGURE 4, so that a brake lining member 166 on the brake shoe 156 engages the side of the rotor 104.

The brake assembly is kept from rotation at the time of braking action by means of a pin 167 in FIGURE 4. This pin engages a slot in the brake assembly. The other end of the pin is anchored in the rotor shaft bearing assembly.

Under the above conditions, the brake is in braking relationship with the rotor, and the rotor is held against rotation. However, the moment the current is caused to flow through the field coil 100, so as to energize the motor, the resulting magnetization of the pole piece 102 draws the armature 152 to the right in FIGURE 4, and the brake assembly thereby causes the brake shoe 156 to move against the spring 162, also to the right in FIGURE 4.

The aforesaid action draws the brake lining 166 away from the rotor 104, so that the rotor is free to rotate. However, the moment that the motor is de-energized, the spring 162 immediately drives the brake shoe 156 in the direction of the rotor, so that the brake lining 166 engages the rotor and immediately stops the rotor.

It will be appreciated that the braking action of the brake assembly 150 is achieved within the field of the motor itself, and without the need for any extraneous solenoid, or other electro-mechanical member.

The invention provides, therefore, an improved motor operated electrical scanner for use in a data acquisition system or the like. The scanner of the invention operates efficiently to serialize digital signals received from associated encoders, so that such signals may be sent to a central processing station. The improved scanner of the invention is caused to operate through a single cycle, and then to come to an immediate and abrupt stop.

It will be appreciated that the scanner of the invention is relatively simple and economical in its construction, and yet which operates with a high degree of precision and reliability.

While a particular embodiment of the invention has been described, modifications may be made. It is intended in the claims to cover the modifications which come within the scope of the invention.

What is claimed is:

1. An electric scanner for use in a data acquisition system, and the like, including: a housing; an electric motor mounted in said housing and including a rotor, a drive shaft coupled to said rotor, and means for establishing a magnetic field in the vicinity of said rotor, said means including an electric field coil for establishing said field upon the flow of electrc current therethrough; a cam mounted on said drive shaft; a switch mounted on said housing for controlling the flow of current through said field coil, said switch engaging said cam to be actuated thereby; a circuit board mounted on said housing; a wiper assembly mounted on said drive shaft to be rotatably driven thereby and including at least one electric brush establishing selective electrical contact with said circuit board as said wiper assembly is rotated; and a brake assembly mounted in said housing and including a shoe member resilient means normally biasing said shoe member against said rotor in braking relationship therewith, and a magnetic armature disposed in said magnetic field established by said field coil and coupled to said shoe member for moving said shoe member out of braking relationship with said rotor upon the flow of electric current through said field coil.

2. An electric scanner for use in a data acquisition system comprising:
   an electric motor;
   a coil for establishing a magnetic field in the vicinity of said motor upon flow of current through said coil;
   a switching assembly coupled with said motor and said coil and governed by the angular rotation of said motor for controlling current flow through said coil;
   a scanner circuit assembly coupled with said motor for acquiring data in response to the rotation of said motor; and
   a brake assembly including a braking member normally biased in braking relationship with said motor, said braking member being responsive to said magnetic field for movement out of said braking relationship in response to the establishment of said field by current flow through said coil.

3. The scanner of claim 2 wherein said scanner circuit assembly includes a circuit board and a wiper assembly rotatably driven by said motor for establishing selective electric contact with said circuit board.

4. The scanner of claim 3 wherein said brake assembly includes a magnetic armature coupled with said braking member disposed in said field established by said coil.

5. The scanner of claim 3 wherein said switching assembly includes a switch for controlling said current flow and a cam coupled with said motor for actuating said switch in response to rotation of said motor.

References Cited

UNITED STATES PATENTS 2,482,840  9/1949  Collins et al. _____ 310—77

FOREIGN PATENTS 324,374  10/1957  Germany.

BERNARD A. GILHEANY, *Primary Examiner.*

H. BROOME, *Assistant Examiner.*